3,480,634
1,4-DIHYDRO-3(2H)-ISOQUINOLONES AND PROCESS FOR THEIR PREPARATION
Jacob Finkelstein, West Englewood, N.J., assignor to Hoffmann-La Roche Inc., Nutley, N.J., a corporation of New Jersey
No Drawing. Filed Feb. 28, 1966, Ser. No. 530,398
Int. Cl. C07d 35/30, 35/14
U.S. Cl. 260—289    6 Claims

ABSTRACT OF THE DISCLOSURE 1,4-dihydro-3(2H)-isoquinolones, having, for example, an aliphatic hydrocarbyl substituent at the 1-position, are prepared, inter alia, by reacting a phenylacetic acid or a phenylacetate with an aliphatic hydrocarbyl aldehyde to form a 3-isochromanone, treating the latter with a saturated aliphatic alcohol to form an alkyl [(haloalkyl)-phenyl]acetate, and treating this product with a primary amine, e.g., alkylamine or alkoxy-substituted alkylamine. The end products are useful as intermediates for the preparation of known isoquinolines.

---

This invention is concerned with dihydroisoquinolones represented by the formula:

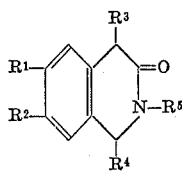

(I)

wherein $R^1$ is hydrogen or a substituent having a negative Hammett para-sigma constant; $R^2$ is hydrogen or a substituent having a negative Hammett para-sigma constant, and is hydrogen when $R^1$ is hydrogen; $R^3$ is hydrogen or lower alkyl; $R^4$ is hydrogen, an aliphatic hydrocarbyl, or a halogen-substituted aliphatic hydrocarbyl radical free from aliphatic unsaturation (i.e., olefinic or acetylenic unsaturation) and containing up to about 10 carbon atoms, inclusive; $R^5$ is hydrogen or a substituent free from aliphatic unsaturation, consisting of no atoms other than carbon, hydrogen, or oxygen, and containing up to 10 carbons, inclusive, and no more than one oxygen, said oxygen being present only in the form of an ether linkage.

$R^1$ and $R^2$ in the compounds of Formula I above are either hydrogen or a substituent which is nonelectron-withdrawing, that is, is either a "neutral" or electron-donating substituent. The nature of the substituent is more readily defined in terms of its Hammett para-sigma constant, which, when positive, indicates that the substituent is an electron-withdrawing substituent, and, when negative, indicates that the substituent is an electron donor. As is known, the Hammett para-sigma constant for a given substituent is determined by measuring the ionization constant of a para-substituted benzoic acid and comparing this value with the ionization constant of unsubstituted benzoic acid. It is to be emphasized, however, that the Hammett para-sigma constant, as used in this application, is employed solely as a criterion for the nature of the substituent for $R^1$ and $R^2$, but is not intended to predict in any fashion reaction rates.

Illustrative examples of Hammett para-sigma constants are set forth in Table I below:

Table I

| Substituent: | Para-sigma constant |
|---|---|
| —OH | −1.37 |
| —NH$_2$ | −0.660 |
| —OCH$_3$ | −0.268 |
| —OC$_2$H$_5$ | −0.25 |
| —N(CH$_3$)$_2$ | −0.205 |
| —C(CH$_3$)$_3$ | −0.197 |
| —CH$_3$ | −0.170 |
| —C$_2$H$_5$ | −0.151 |
| —CH(CH$_2$)$_2$ | −0.151 |
| —C$_6$H$_5$ | +0.009 |
| —Cl | +0.227 |
| —Br | +0.232 |
| —CN | +0.657 |
| —CO$_2$H | +0.728 |
| —NO$_2$ | +0.778 |
| —C(O)CH$_3$ | +0.874 |
| —CHO | +1.126 |

As can be seen from Table I, suitable substituents for $R^1$ and $R^2$ include lower alkyl, such as methyl, ethyl, tert.-butyl, and the like; hydroxy; lower alkoxy, such as methoxy, ethoxy, and the like; amino; N-lower alkylamino, such as methylamino or ethylamino; and N,N-di-(lower dialkyl)amino, such as N,N-di-methylamino, and the like. In addition, $R^1$ and $R^2$, when taken together, can be alkylenedioxy, such as methylenedioxy, or ethylenedioxy, and the like. On the other hand, neither $R^1$ nor $R^2$ can be halo, cyano, carboxyl, nitro, or the like. In general, it is preferred that the combined equivalent weights of $R^1$ and $R^2$ be no greater than about 200, and especially no greater than 100. Especially preferred substituents include lower alkyl, lower alkoxy, and lower alkylenedioxy.

By the term "hydrocarbyl" is meant a substituent consisting only of hydrogen and carbon; by the term "aliphatic hydrocarbyl" is meant a hydrocarbyl substituent having the valence bond from an aliphatic carbon atom, i.e., an alkyl or an aralkyl radical; by the term "lower alkyl" is meant an alkyl radical including straight and branched chain alkyl radicals containing from 1 to about 6 carbon atoms.

The isoquinolones of Formula I above are produced by the following reaction scheme:

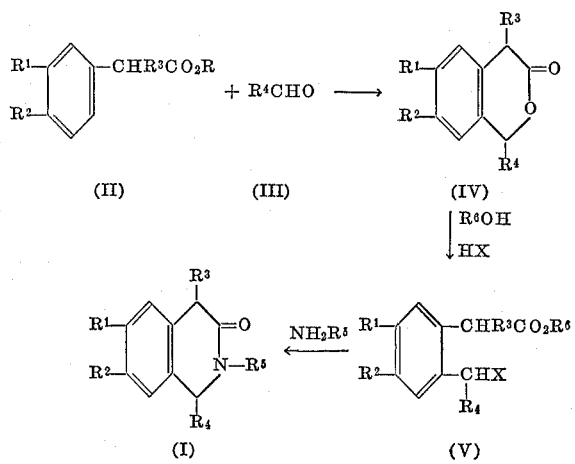

wherein $R^1$, $R^2$, $R^3$, $R^4$, and $R^5$ are as defined above; R is hydrogen or lower alkyl; $R^6$ is lower alkyl; and X is halogen.

Thus the process of this invention comprises reacting a phenylacetic acid or its lower alkyl ester I with an aliphatic aldehyde III to produce a 3-isochromanone IV. The isochromanone is reacted with alcohol and a hydrogen halide to produce an alkyl [2-(α-haloalkyl)phenyl]-acetate V. This ester is then reacted with ammonia or an aliphatic or aromatic primary amine to produce an isoquinolone having the Formula I.

The first step of the process of this invention comprises reacting a phenylacetic acid or its ester with an aldehyde in the presence of an acidic promoter. Suitable acids include mineral acids such as sulfuric acid, hydrochloric acid, phosphoric acid, and the like; organic sulfonic acids such as p-toluene-sulfonic acid; and organic carboxylic acids such as trifluoroacetic acid, and the like. In addition, Lewis acids such as zinc chloride, aluminum chloride, and the like, may be employed.

The catalytic amount is not narrowly critical and can vary from about 10 mole percent or less to equimolar amounts or higher, based upon either reactant. Although a reaction solvent is not required, solvents such as carboxylic acids, for example, acetic acid; esters, for example, ethyl acetate; and ethers, for example, tetrahydrofuran or dioxane, may be employed. The reaction temperature is not narrowly critical and temperatures from about room temperature (25–30° C.) or below to about 100° C. or above are suitable. The molar ratio of reactants is not critical, although equimolar amounts are normally employed.

Illustrative of the phenylacetic acid or phenylacetate reactants represented by the formula:

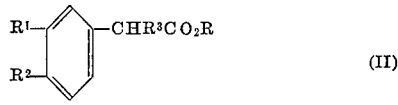
(II)

wherein R, $R^1$, $R^2$, and $R^3$ have the same meaning as above, are phenylacetic acid, 3-tolylacetic acid, 3,4-xylylacetic acid, 3-hydroxyphenylacetic acid, 3,4-dihydroxyphenylacetic acid, 3-methoxyphenylacetic acid, 3,4-dimethoxyphenylacetic acid, 3,4-methylenedioxyphenylacetic acid, (3-methoxy-4-tolyl)acetic acid, 2-phenylpropionic acid, 2-(3-tolyl)propionic acid, 2-(3,4-dimethoxyphenyl)propionic acid, 2-(3-hydroxy-4-methylphenyl)propionic acid, 2-phenylbutyric acid, methyl phenylacetate, ethyl phenylacetate, and the like.

The second reactant in the first step of the process of this invention is an aliphatic aldehyde of the formula:

$$R^4CHO \qquad (III)$$

wherein $R^4$ has the same meaning as above. Illustrative of these aldehydes are formaldehyde, acetaldehyde, propionaldehyde, hexaldehyde, 2-ethylhexaldehyde, chloral, phenylacetaldehyde, tolylacetaldehyde, xylylacetaldehyde, and the like.

Illustrative of the 3-isochromanone products of this first step are 1-methyl-3-isochromanone, 1-ethyl-3-isochromanone, 1-propyl-3-isochromanone, 6-methyl-3-isochromanone, 7-methyl-3-isochromanone, 1,6-dimethyl-3-isochromanone, 1,6,7 - trimethyl - 3 - isochromanone, 6 - hydroxy - 3 - isochromanone, 6 - methoxy - 3 - isochromanone, 6,7 - dimethoxy - 3 - isochromanone, 6 - methoxy - 1-methyl-3-isochromanone, 6,7-dimethoxy-1-methyl-3-isochromanone, and the like.

The second step of the process of this invention comprises reacting the 3-isochromanone product of step 1 with a saturated aliphatic alcohol, i.e., a lower alkanol, and a hydrogen halide. Suitable alkanols include methanol, ethanol, propanol, butanol, tert.-butanol, and the like. The hydrogen halides employed are those of halogens having atomic numbers of from 17 to 53, inclusive, i.e., hydrogen chloride, hydrogen bromide, and hydrogen iodide.

The conditions of this reaction are not narrowly critical, although the reaction does require substantially anhydrous conditions. The molar ratio of reactants is not critical, although it is preferred to employ both the hydrogen halide and the alcohol in molar excess. No solvent is necessary, excess alcoholic reactant being adequate for this purpose. It is preferred, however, that low temperatures, i.e., room temperature and below be employed to retain the hydrogen halide in solution in the alcohol.

The products of this second step are the alkyl [(haloalkyl)phenyl]acetates of the formula:

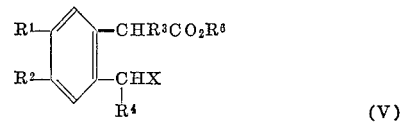
(V)

wherein $R^1$, $R^2$, $R^3$, $R^4$, $R^6$, and X have the same meaning as above, illustrative of which are methyl [2-(chloromethyl)phenyl]acetate, methyl [2-(bromomethyl)phenyl]acetate, methyl [2-(iodomethyl)phenyl]acetate, ethyl [2-(bromomethyl)phenyl]acetate, tert.-butyl [2-(bromoethyl)phenyl]acetate, ethyl [2-(1'-bromoethyl)phenyl]acetate, ethyl [2-(1'bromopropyl)phenyl]acetate, ethyl [2-(bromomethyl)-5-methylphenyl]acetate, ethyl [3,4-dimethyl - 6 - (bromomethyl)phenyl]acetate, ethyl [3,4 - dimethoxy-6-(bromomethyl)phenyl]acetate, and the like.

The final step of the process of this invention comprises reacting the ester produced as described above with ammonia or a primary amine of the formula:

$$R^5NH_2$$

wherein $R^5$ is as defined above. The amine, when employed, is preferably a hydrocarbylamine, such as methylamine, ethylamine, propylamine, aniline, and the like. However, one can also employ alkoxy-substituted amines, such as 2-methoxyethylamine, 2-ethoxypropylamine, 4-methoxyaniline, and the like.

The conditions for this final step are not critical but the reaction should be conducted under substantially anhydrous conditions. The reaction is generally conducted at elevated temperatures, especially in the range of from 50–200° C. Elevated pressures, although not required, are preferred when a low boiling or normally gaseous nitrogen compound is employed to ensure solubility of the nitrogen compound in the liquid phase. Although normally unnecessary inert solvents such as alcohols, ethers, aliphatic and aromatic hydrocarbons, may be employed. The molar ratio of reactants is not critical, but at least an equimolar ratio of nitrogen compound to ester is preferred.

Illustrative of the 1,4 - dihydro - 3(2H) - isoquinolone products of this invention are:

1,4-dihydro-1-methyl-3(2H)-isoquinolone,
1-ethyl-1,4-dihydro-3(2H)-isoquinolone,
1,4-dihydro-1-propyl-3(2H)-isoquinolone,
1-chloromethyl-1,4-dihydro-3(2H)-isoquinolone,
1-dichloromethyl-1,4-dihydro-3(2H)-isoquinolone,
1-trichloromethyl-1,4-dihydro-3(2H)-isoquinolone,
1-benzyl-1,4-dihydro-3(2H)-isoquinolone,
1,4-dihydro-4-methyl-3(2H)-isoquinoline,
4-ethyl-1,4-dihydro-3(2H)-isoquinolone,
1,4-dihydro-6-methyl-3(2H)-isoquinolone,
1,4-dihydro-6,7-dimethyl-3(2H)-isoquinolone,
1,4-dihydro-6-methoxy-3(2H)-isoquinolone,
1,4-dihydro-6,7-dimethoxy-3(2H)-isoquinolone,
1,4-dihydro-6,7-methylenedioxy-3(2H)-isoquinolone,
1,4-dihydro-N-methyl-3(2H)-isoquinolone,
N-ethyl-1,4-dihydro-3(2H)-isoquinolone,
1,4-dihydro-N-phenyl-3(2H)-isoquinolone,
N-(4-ethoxyphenyl)-1,4-dihydro-3(2H)-isoquinolone,
1,4-dihydro-6,7-dimethoxy-1,4-dimethyl-3(2H)-isoquinolone,
and the like.

The products of the process of this invention are all useful intermediates for the production of isoquinolines via known procedures, such as by reduction of the isoquinolone with lithium aluminum hydride. Exemplary of the aforementioned isoquinolines is 6-hydroxy-7-methoxy-1 - methyl - 1,2,3,4 - tetrahydro-isoquinoline (Salsoline), known for its antihypertensive activity.

The following examples are illustrative.

EXAMPLE 1

6,7-dimethoxy-3-isochromanone

A solution of 11.7 grams of 3,4-dimethoxyphenylacetic acid in 30 milliliters of acetic acid was mixed with 10 milliliters of concentrated hydrochloric acid and 10 milliliters of 37 percent formalin solution. The resulting mixture was heated on a steam bath for one hour, after which the reaction mixture was diluted with 300 milliliters of water and extracted with chloroform. The chloroform extract was washed with dilute aqueous sodium bicarbonate until neutral, dried, and concentrated in vacuo to yield 10.5 grams of 6,7-dimethoxy-3-isochromanone, melting point 108–109.5° C.

Analysis.—Calculated for $C_{11}H_{12}O_4$: C, 63.46; H, 5.77. Found: C, 63.59; H, 5.10.

In a similar manner, 3-isochromanone is produced by substituting phenylacetic acid for 3,4-dimethoxyphenylacetic acid.

EXAMPLE 2

6,7-dimethoxy-1-methyl-3-isochromanone

A mixture of 5.9 grams of 3,4-dimethoxyphenylacetic acid and 1.3 grams of paraldehyde in 20 milliliters of acetic acid was stirred at 0–2° C. while being saturated by a stream of dry hydrogen chloride. The resulting reaction mixture was stirred at room temperature overnight and then poured into 200 milliliters of cold water. The resulting mixture was extracted with chloroform and the chloroform extract was washed with 5 percent sodium bicarbonate solution until neutral, dried, and concentrated in vacuo to an oil, which upon trituration with petrol (30–60° C.) turned solid. After recrystallization from benzene, the 6,7-dimethoxy - 1 - methyl-3-isochromanone weighed 2.5 grams and melted at 118–121° C.

Analysis.—Calculated for $C_{12}H_{14}O_4$: C, 64.86; H, 6.30. Found: C, 64.99; H, 6.44.

EXAMPLE 3

6,7-dimethoxy-1-n-propyl-3-isochromanone

A mixture of 5.9 grams of 3,4-dimethoxyphenylacetic acid and 2.16 grams of n-butyraldehyde suspended in 20 milliliters of trifluoroacetic acid at 0° C. was saturated with dry hydrogen chloride and held at room temperature for 18 hours. The resulting solution was poured into 200 milliliters of water and then extracted with chloroform. After washing the extract with a 5 percent sodium bicarbonate solution and then water, it was dried and concentrated in vacuo to a black oily residue. Upon trituration with petrol (30–60° C.) a solid material was produced which after recrystallization from ethanol weighed 400 milligrams and melted at 102–104° C.

Analysis.—Calculated for $C_{14}H_{18}O_4$: C, 67.20; H, 7.20. Found: C, 67.13; H, 7.14.

EXAMPLE 4

1-trichloromethyl-6,7-dimethoxy-3-isochromanone

To a mixture of 2.24 grams of ethyl 3,4-dimethoxyphenylacetate, 1.5 grams of chloral and 0.2 gram of water was added with stirring a solution of 9.9 grams of concentrated sulfuric acid and 1.1 gram of water. The reaction temperature rose spontaneously to 40° C. After holding the reaction mixture at room temperature overnight, it was poured onto chipped ice and solid 1-trichloromethyl-6,7-dimethoxy - 3 - isochromanone was obtained, which after filtration, washing with water and drying, weighed 2.67 grams. After recrystallization from isopropanol, the product melted at 152–153° C.

Analysis.—Calculated for $C_{12}H_{11}Cl_3O_3$: C, 44.24; H, 3.38; Cl, 32.72. Found: C, 44.29; H, 3.57; Cl, 32.39.

EXAMPLE 5

Ethyl [6-(bromomethyl)-4,5-dimethoxyphenyl]acetate

To a stirred solution of 20 grams of hydrogen bromide in 300 milliliters of absolute ethanol at 10° C. was added 4.2 grams of 6,7-dimethoxy-3-isochromanone. The reaction mixture was stirred while allowing the temperature to rise to 28° C. After standing overnight the ethanol was distilled from the reaction mixture at 20° C. and 2–3 mm., leaving ethyl [6-(bromomethyl) - 4,5 - dimethoxyphenyl]acetate as a soft purple solid.

EXAMPLE 6

1,4-dihydro-6,7-dimethoxy-3(2H)-isoquinolone

An autoclave was charged with 6 grams of ethyl [6-(bromomethyl)-4,5-dimethoxyphenyl]acetate and approximately 75 milliliters of liquid ammonia. The autoclave was sealed and heated at 100° C. under 1000 pounds of nitrogen pressure for 10 hours. Upon evaporation of the ammonia and recrystallization from ethanol, there was obtained 1.9 grams of 1,4-dihydro-6,7-dimethoxy-3(2H)-isoquinolone, melting point 200–202° C.

Analysis.—Calculated for $C_{11}H_{13}NO_3$: C, 63.76; H, 6.28; N, 6.76. Found: C, 63.85; H, 6.08; N, 7.00.

EXAMPLE 7

1,4-dihydro-6,7-dimethoxy-N-methyl-3(2H)-isoquinolone

Employing apparatus and procedures similar to those described in Example 6 except that 8.5 grams of the ethyl ester were employed and 75 milliliters of methylamine was substituted for the liquid ammonia, 2.5 grams of 1,4-dihydro - 6,7 - dimethoxy - N - methyl - 3(2H) - isoquinolone, melting point 119.5-121.5° C., was produced.

Analysis.—Calculated for $C_{12}H_{15}NO_3$: C, 65.15; H, 6.78; N, 6.33. Found: C, 65.25; H, 6.52; N, 6.37.

EXAMPLE 8

N-(4-ethoxyphenyl)-1,4-dihydro-6,7-dimethoxy-3(2H)-isoquinolone

To a cold solution of 200 milliters of absolute ethanol containing 20 grams of anhydrous hydrogen bromide, 4.2 grams of 6,7-dimethoxy-3-isochromanone was added. After holding the reaction mixture at room temperature for 20 hours, the ethanol was evaporated. The residue was suspended in dry benzene which was evaporated in residue. After repetition of the benzene treatment, a dry solid ethyl [6-(bromomethyl)-4,5-dimethoxyphenyl] acetate was obtained. This product was dissolved in 200 milliters of absolute ethanol and the resulting solution was mixed with 13.7 grams of 4-ethoxyaniline. The resulting solution was heated at 100° C. for 8 hours under 1000 pounds nitrogen pressure in an autoclave. After vacuum distillation of the ethanol, the remaining black oily liquid was diluted with water. This aqueous mixture was extracted with chloroform and the extracts were washed with dilute hydrochloric acid and water. After drying and evaporating of chloroform, there was obtained solid N-(4 - ethoxyphenyl) - 1,4 - dihydro - 6,7 - dimethoxy - 3-(2H)-isoquinolone, which upon recrystallization first from ethanol and then from ethyl acetate weighed 2.5 grams and melted at 167–170° C.

Analysis.—Calculated for $C_{19}H_{21}NO_4$: C, 69.72; H, 6.42; N, 4.28. Found: C, 69.99; H, 6.15; N, 4.42.

What is claimed is:

1. The process of producing a 1,4-dihydro-3(2H)-isoquinolone of the formula:

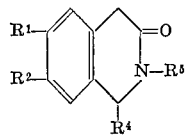

wherein
R¹ and R² are selected from the group consisting of hydroxy and methoxy and when taken together are methylenedioxy;
R⁴ is selected from the group consisting of hydrogen and methyl; and
R⁵ is selected from the group consisting of hydrogen and methyl
which comprises reacting an alkyl [(haloalkyl)phenyl] acetate of the formula

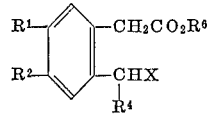

wherein
R¹, R² and R⁴ are as described above;
R⁶ is lower alkyl; and
X is halogen having an atomic number of from 17–53
with a nitrogen compound of the formula $R^5NH_2$ wherein R⁵ is as described above.

2. The process claimed in claim 1 wherein R¹ and R² are methoxy.

3. The process as claimed in claim 2 wherein R⁴ is methyl.

4. The process of producing a 1,4-dihydro-3(2H)-isoquinolone of the formula:

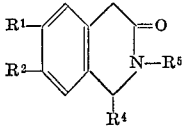

wherein
R¹ and R² are selected from the group consisting of hydroxy and methoxy and when taken together are methylenedioxy;
R⁴ is selected from the group consisting or hydrogen and methyl; and
R⁵ is selected from the group consisting of hydrogen and methyl
which comprises the steps of (a) reacting a phenylacetic acid or ester thereof of the formula

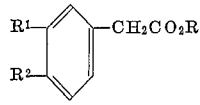

wherein
R¹ and R² are as described above;
R is selected from the group consisting of hydrogen and lower alkyl
with an aliphatic aldehyde of the formula

R⁴CHO wherein R⁴ is as described above in the presence of an acid promoter selected from the group consisting of sulfuric acid, hydrochloric acid, phosphoric acid, p-toluenesulfonic acid, trifluoroacetic acid and Lewis acids to product a 3-isochromanone;

(b) reacting said 3-isochromanone with a lower alkanol and a hydrogen halide of a halogen having an atomic number of from 17 to 53 to produce an alkyl acetate; and (c) reacting said alkyl [(haloalkyl)prenyl] acetate with a nitrogen compopund of the formula $R^5NH_2$ wherein R⁵ is as described above.

5. The process as claimed in claim 4 wherein R¹ and R² are methoxy.

6. The process as claimed in 5 wherein R⁴ is methyl.

References Cited
UNITED STATES PATENTS

| | | | |
|---|---|---|---|
| 2,647,902 | 8/1953 | Aschner | 260—289 |
| 2,651,637 | 9/1953 | Henecka | 260—289 |
| 3,040,048 | 6/1962 | Godefroi | 260—289 X |
| 3,301,857 | 1/1967 | Berger et al. | 260—289 X |
| 3,318,906 | 5/1967 | McKeon et al. | 260—289 X |
| 3,103,513 | 9/1963 | Nauta | 260—283 |
| 3,395,152 | 7/1968 | Shavel | 260—288 |

OTHER REFERENCES

Merck Index, 7th ed., p. 536 (1960).

DONALD G. DAUS, Primary Examiner

U.S. Cl. X.R.

260—473, 583, 601, 288, 283, 287, 345.2, 469 599, 606, 515